(12) United States Patent
Atencio

(10) Patent No.: US 6,848,883 B2
(45) Date of Patent: Feb. 1, 2005

(54) HAY BALE SPEAR

(76) Inventor: Steven E. Atencio, 10300 N. Tomahawk Rd., Parker, CO (US) 80138

( * ) Notice: Subject to any disclaimer, the term of this patent is extended or adjusted under 35 U.S.C. 154(b) by 0 days.

(21) Appl. No.: 10/462,355

(22) Filed: Jun. 16, 2003

(65) Prior Publication Data

US 2004/0253089 A1 Dec. 16, 2004

(51) Int. Cl.⁷ .................................................. E02F 3/80
(52) U.S. Cl. ........................ 414/724; 414/24.5; 414/911
(58) Field of Search ............................... 414/724, 24.5, 414/24.6, 911

(56) References Cited

U.S. PATENT DOCUMENTS

| | | | | |
|---|---|---|---|---|
| 3,312,361 A | * | 4/1967 | Foster ......................... | 414/724 |
| 3,921,837 A | * | 11/1975 | Vandewater ................ | 414/24.5 |
| 4,120,405 A | * | 10/1978 | Jones et al. ................. | 414/24.5 |
| 4,299,522 A | | 11/1981 | Smith | |
| 4,329,103 A | | 5/1982 | Miller | |
| 5,071,311 A | | 12/1991 | Edington | |
| 5,240,365 A | | 8/1993 | Lynch | |

OTHER PUBLICATIONS

Farm Star BBS–1560.
Farm Star UBSF–1535.
Worksaver BBSF–12.
Farm Star Attachments.
Farm Star Bale Spears.

* cited by examiner

Primary Examiner—Donald W. Underwood
(74) Attorney, Agent, or Firm—Richard W. Hanes; Hanes & Schutz, P.C.

(57) ABSTRACT

A loader bucket mounted bale spear comprising an inverted "T" shaped unitary frame having a transverse base adapted to sit on the floor of the bucket and having a stem attached perpendicularly to the base with a free distal end, a plurality of same facing sockets carried by the frame for selectively mounting one or more elongated tines, an anchor bar attached to the loader bucket and a tongue and socket assembly for interconnecting the distal end of the frame stem to the anchor bar on the loader bucket.

2 Claims, 5 Drawing Sheets

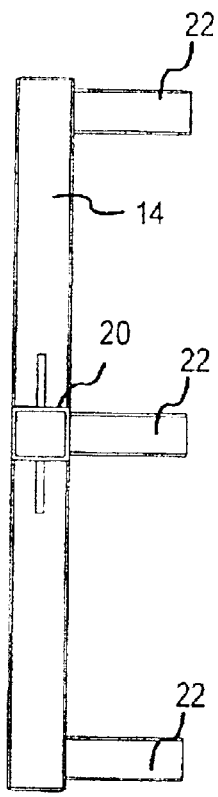
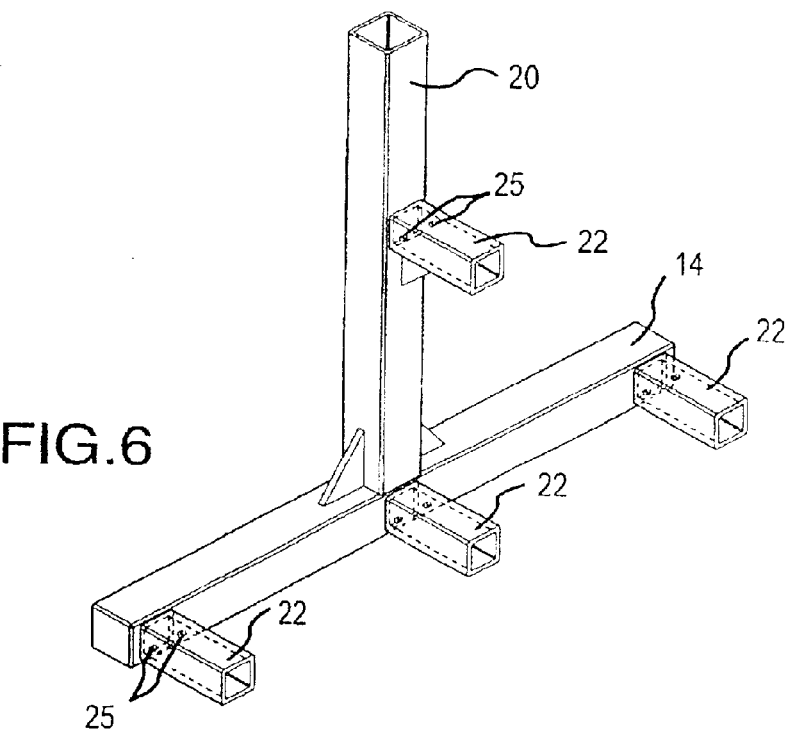
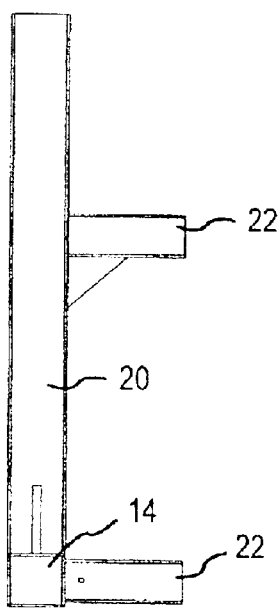
FIG.6
FIG.5
FIG.7 ized by complexity: US 6,848,883 B2

HAY BALE SPEAR

The present invention relates generally to agricultural implements and more particularly to a spear type of hay bale pick up that may be mounted on the bucket of a front end loader.

BACKGROUND OF THE INVENTION

Utilizing a spear or elongated tine to pick up and maneuver hay bales has been the tradition for many years. Front end loader buckets have found frequent employment as the preferred means of mounting the spear and transporting the hay bales, since the spearing apparatus does not justify the sole occupation of a specialized vehicle.

Exemplary of relevant prior bucket-mounted bale spearing apparatus are the devices shown in the following U.S. Patents: U.S. Pat. No. 5,071,311 for Loader Bucker Mounted Hay Bale Spear; U.S. Pat. No. 4,299,522 for Tractor-Mountable Front And Rear Bale-Impaling Hay-Carriers and U.S. Pat. No. 4,329,103 for Bucket Loader Attachment. Other similar devices are in commercial use, but are not the subject of U.S. patents. While all of the aforementioned devices are apparently successful in accomplishing their respective purposes, they are all encumbered by complexity, either in the structure of the spearing apparatus itself or in the means for attaching and detaching the device to the prime mover or to the bucket of a traditional front end loader.

Accordingly, it is the primary object of the present invention to provide a hay bale spear that is simple and sturdy in its construction and is easily mounted on the bucket of a front-end loader.

A second object of the invention is to provide a hay bale spear that is subject to rapid modification by the user for lifting and carrying pallets, fencing and the like.

Other and further objects, features and advantages of the present invention will become obvious upon a reading the following description of a preferred form of the invention, taken in conjunction with the accompanying drawings, in which:

FIG. 5 is a perspective view of the frame of the bale spear.

FIG. 6 is a top view of the frame of the bale spear.

FIG. 7 is a side view of the frame of the bale spear.

DETAILED DESCRIPTION OF THE INVENTION

Figure 1:
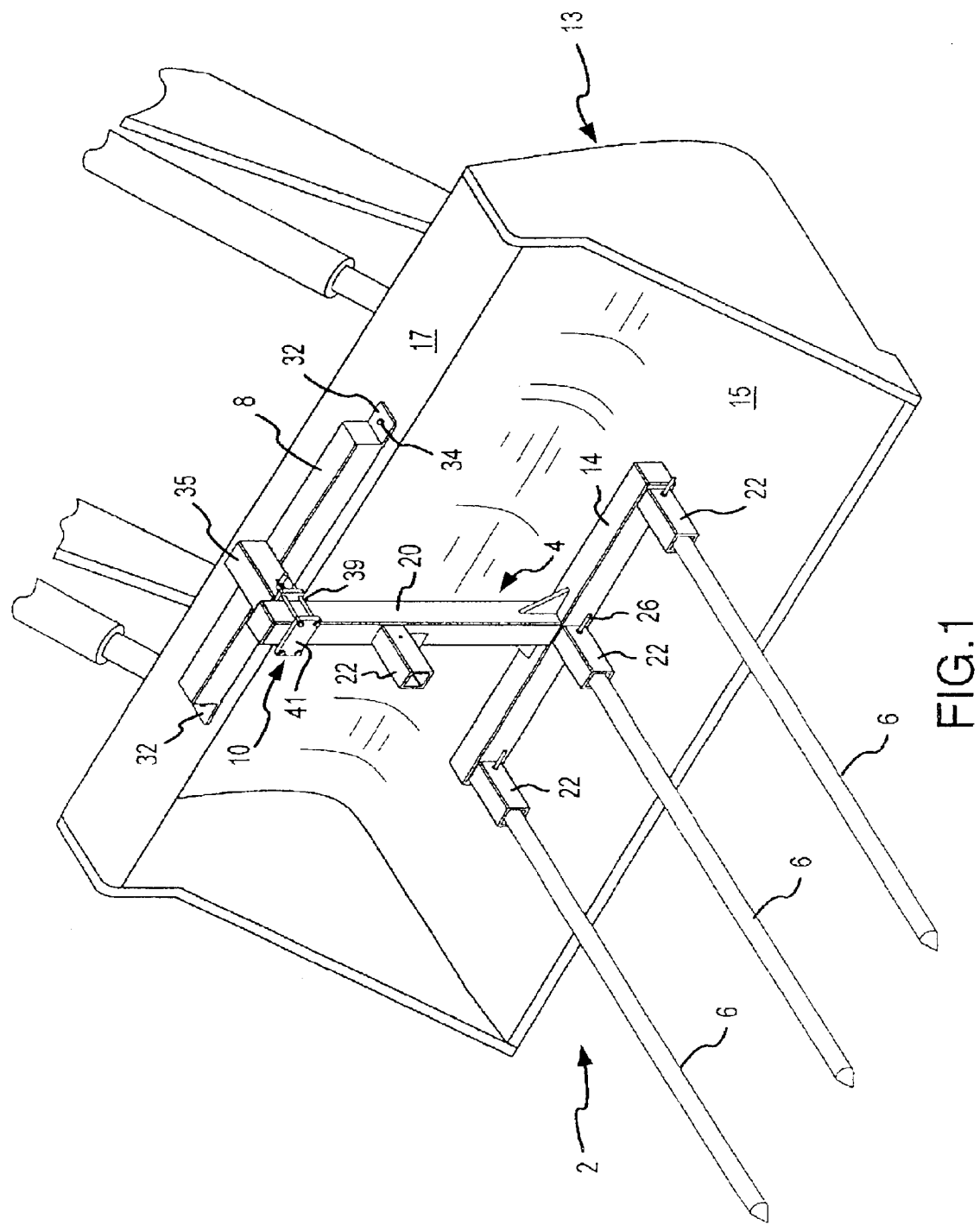
FIG. 1 is a perspective view of the bale spear of the present invention mounted on the bucket of a front-end loader.
Figure 2:
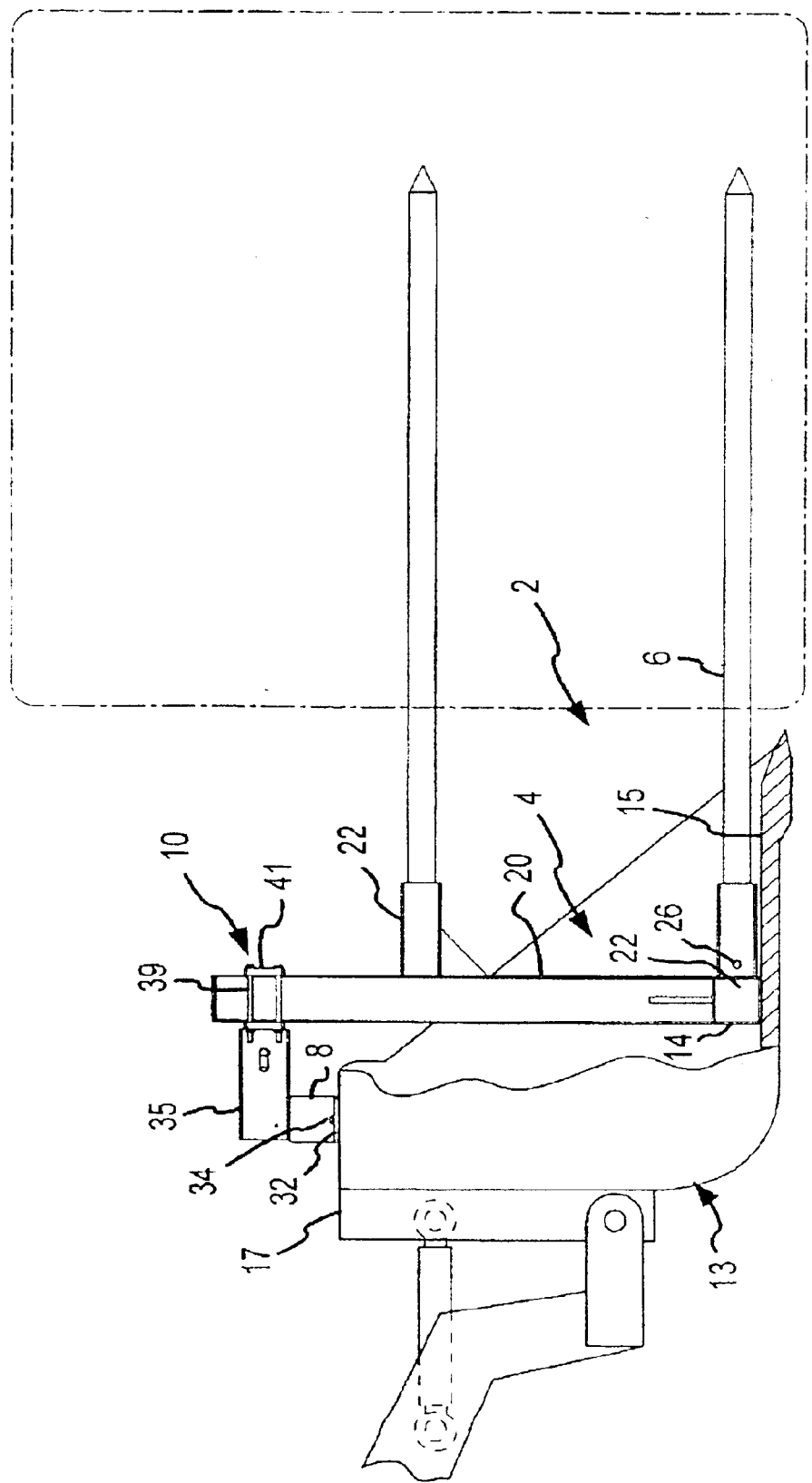
FIG. 2 is a side view of the bale spear showing the device in operation lifting a bale of hay.
Figure 3:
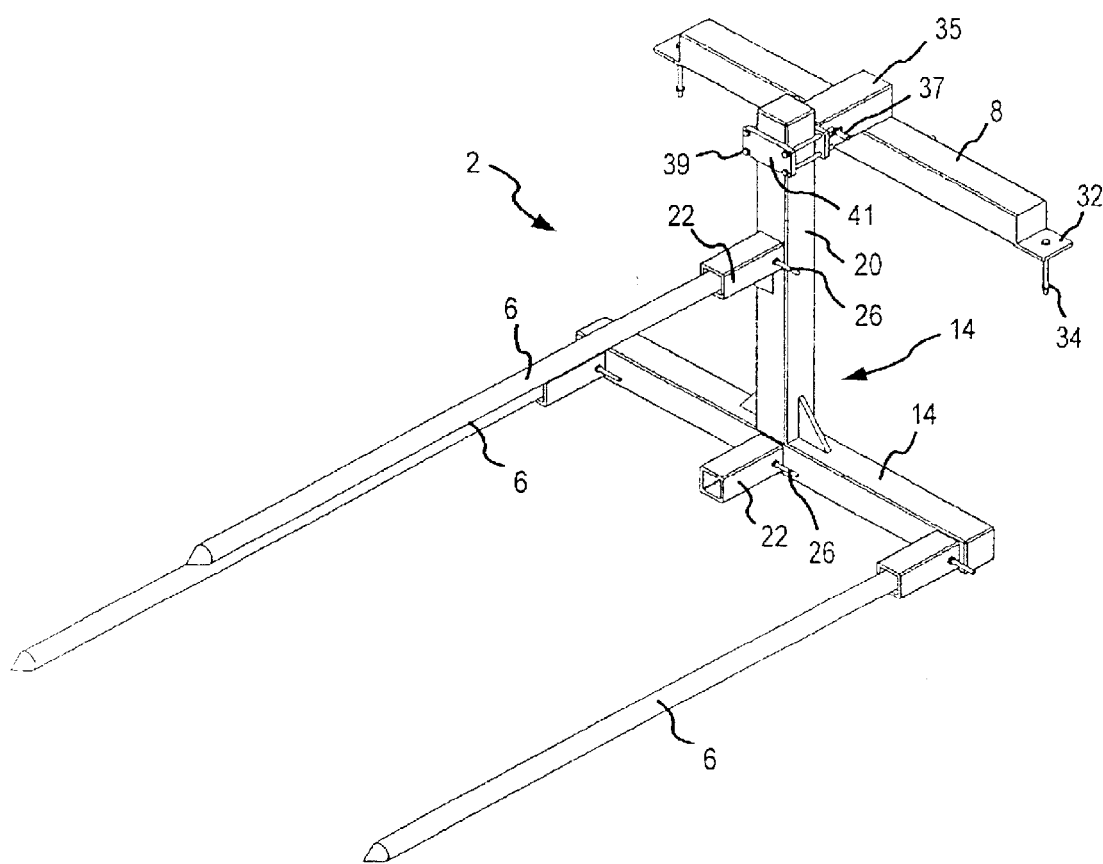
FIG. 3 is a perspective view of the bale spear of the present invention with two tines carried by the transverse base member and one by the vertical stem member.

Referring first to FIG. 1, the bale spear 2 of the present invention comprises four fundamental parts, including an inverted "T" shaped frame 4, a plurality of spearing tines 6, an anchoring bar 8 and a bracket 10 to interconnect the frame and the anchoring bar. When mounted on the bucket 13 of a typical front-end loader (not shown), the transverse base member 14 of the frame 4 rests on the inside surface 15 of the bottom portion of the bucket 13. The anchoring bar 8 is bolted, welded or otherwise attached, to the top lip 17 of the bucket and may be left attached to the bucket when the bale spear is not in use because the anchoring bar does not interfere with other uses of the bucket. The bracket 10 interconnects the vertical stem 20 of the frame 4 with the anchoring bar 8 with a simple detachable connection to be later explained. Sockets 22 that are attached to both the lateral base 14 and the vertical stem 20 of the frame 4 carry the tines 6. Although three tines are depicted in the drawings, four tines could be used, the fourth being carried by the vertical stem 20. When using three tines they may be alternated between the four sockets 22 to form a spear configuration that best suits the requirements. For example, the spear configuration of FIG. 3 is advantageously employed when carrying a large hale bale, as illustrated in FIG. 2. The configuration shown in FIG. 1, where all of the tines are carried by the transverse base member 14, is preferred for supporting and carrying pallets, fence sections and the like, similar to the functions of a fork lift.

Figure 4:
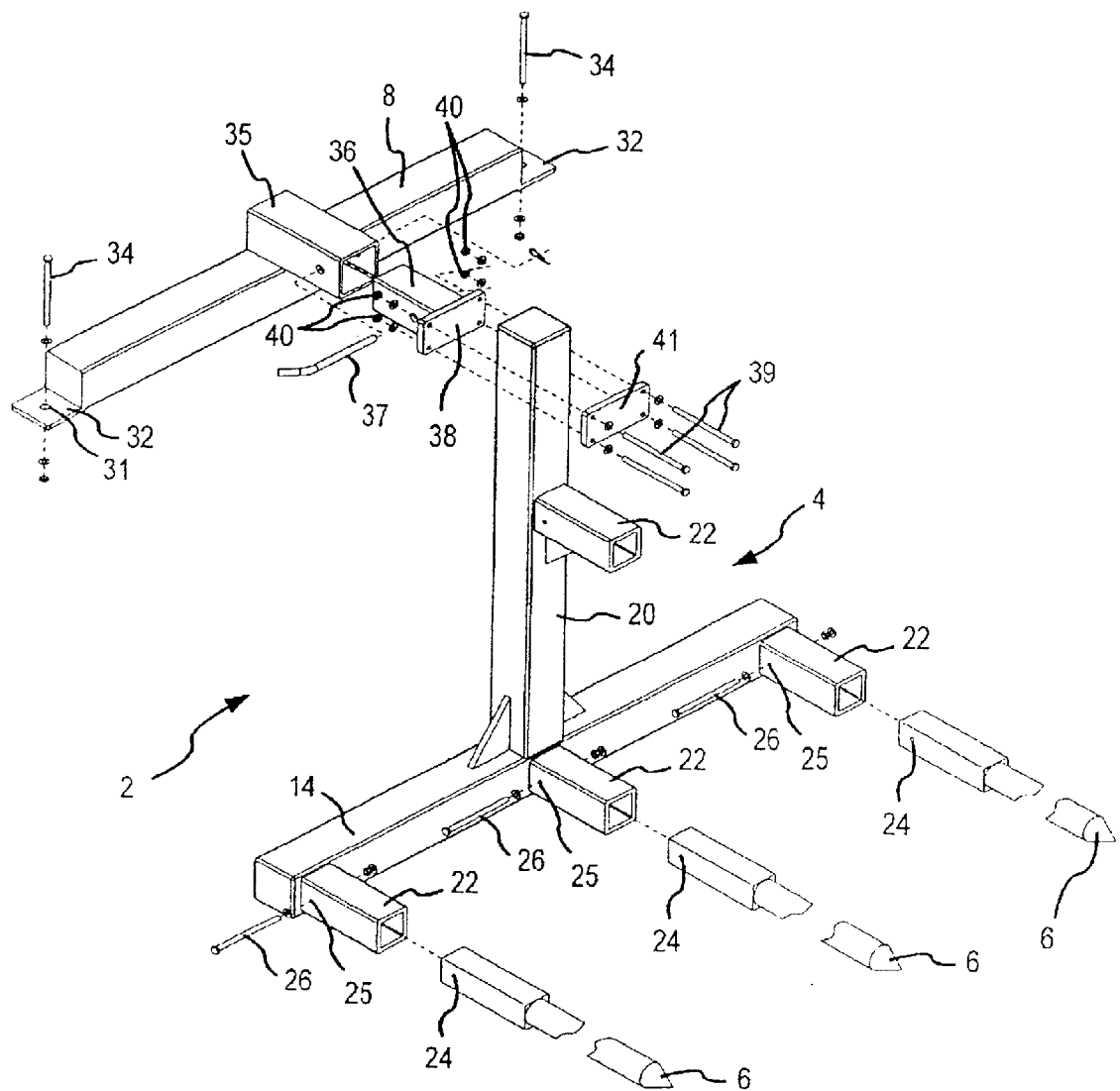
FIG. 4 is a perspective view exploded view of the bale spear.

Addressing the details of the construction of a preferred form of the invention, reference is made to the exploded view of FIG. 4. The frame 4 is preferably constructed of metal tubing with the sockets 22 welded to the outward facing tubular surfaces of the lateral base member 14 and the vertical stem member 20. The tines 6 are straight rigid round metal bars with rectangular shaped ends that fit snugly into the rectangular tubes 22 that form receiving sockets for holding the tines 6. The rectangular ends of each tine 6 are drilled so as to form a hole 24 through which a locking pin 26 may be inserted to hold the tine in its respective socket. Each of the tubular sockets is provided with aligned apertures 25 in both sides of the tube socket to receive the locking pin 26.

The anchoring bar 8 is provided with an aperture 31 in each of its laterally extending end ears 32 through which a bolt 34 is positioned to fasten the bar 8 to the top lip 17 of the bucket 13, as shown in FIG. 1. Centrally located on and attached to the bar 8 is a projecting tubular hitch socket 35. The hitch socket 35 is sized and dimensioned to snugly receive a correspondingly sized tubular tongue 36. A pin 37 is provided for insertion into aligned holes in the hitch socket and tongue when the tongue is inserted into the socket for the purpose of interconnecting the tongue 36 and the hitch socket 35.

Welded, or otherwise attached, to one end of the tubular tongue 36 is a flat rectangular mounting plate 38 having holes in each corner thereof to receive clamping bolts 39. Prior to being inserted in the corner holes of the mounting plate 38, the clamping bolts 39 are directed through the corner holes in a bracket plate 41. The mounting plate 38, the clamping bolts 39 and the bracket plate 41 comprise the heretofore-mentioned bracket 10 that interconnects the stem 20 of the frame 4 and the tubular hitch socket 35 of the anchoring bar 8. The interconnection is made by positioning the mounting plate 38 and the bracket plate 41 on opposing sides of the stem member 20 and tightening securing nuts 40 on the clamping bolts 39 so that the two plates sandwich the stem 20 tightly there between.

In operation, when it is desired to mount the hay bale spear 2 onto the bucket 13 of the front-end loader the frame 4 of the spear assembly is set down on the floor of the bucket and the tubular tongue 36 is inserted into the hitch socket 35 of the anchoring bar 8. The connection between the socket 35 and the tongue 36 is secured by inserting the pin 37 into the aligned apertures in the hitch socket and the tongue. Removal of the hay bale spear merely requires removal of the pin 37, withdrawal of the tongue 36 from the hitch socket 35 and then removing the frame 4 and tines 6 from the bucket 13.

What is claimed is:

1. A loader bucket mounted bale spear comprising, an inverted "T" shaped unitary frame having a transverse base and a stem perpendicular to the base with a distal end, anchoring means for interconnecting the frame to the loader bucket, including, a mounting socket having means for attachment to the loader bucket, tongue means attached to the stem for interconnecting the frame with the mounting socket, aligned apertures in the mounting socket and the tongue means, and pin means for selective insertion onto the aligned apertures, a first plurality of same facing sockets carried by the transverse base, at least one same facing socket carried by the stem, and a plurality of elongated tines carried by the same facing sockets.

2. A loader bucket mounted bale spear comprising, an inverted "T" shaped unitary frame having a transverse base and a stem perpendicular to the base with a free end, a first plurality of same facing sockets carried by the frame, a first plurality of elongated rigid tines having insert means for mounting the tines within respective sockets on the frame anchoring means for interconnecting the free distal end of the stem with the loader bucket, including, a mounting socket having means for attachment to the loader bucket, tongue means attached to the free distal end of the stem for interconnecting the stem with the mounting socket, aligned apertures in the mounting socket and the tongue means, and pin means removably disposed in the aligned apertures.

* * * * *